United States Patent
Durham et al.

(10) Patent No.: US 7,594,269 B2
(45) Date of Patent: Sep. 22, 2009

(54) PLATFORM-BASED IDENTIFICATION OF HOST SOFTWARE CIRCUMVENTION

(75) Inventors: David Durham, Hillsboro, OR (US); Ravi Sahita, Beaverton, OR (US); Priya Rajagopal, Wharton, NJ (US)

(73) Assignee: Intel Corporation, Santa Clara, CA (US)

( * ) Notice: Subject to any disclaimer, the term of this patent is extended or adjusted under 35 U.S.C. 154(b) by 867 days.

(21) Appl. No.: 10/976,592

(22) Filed: Oct. 29, 2004

(65) Prior Publication Data

US 2006/0095967 A1    May 4, 2006

(51) Int. Cl.
G06F 11/00 (2006.01)
G06F 12/14 (2006.01)
G06F 12/16 (2006.01)
G08B 23/00 (2006.01)

(52) U.S. Cl. .......................... 726/23; 714/38
(58) Field of Classification Search .................. 726/23
See application file for complete search history.

(56) References Cited

U.S. PATENT DOCUMENTS

| | | | |
|---|---|---|---|
| 5,029,169 A * | 7/1991 | Smyk .......................... | 714/38 |
| 5,335,342 A * | 8/1994 | Pope et al. .................... | 714/38 |
| 5,611,044 A * | 3/1997 | Lundeby ...................... | 714/38 |
| 5,673,386 A * | 9/1997 | Batra ........................... | 714/38 |
| 5,978,912 A | 11/1999 | Rakavy et al. | |
| 6,202,176 B1 * | 3/2001 | Baldischweiler et al. ...... | 714/38 |
| 6,243,809 B1 | 6/2001 | Gibbons et al. | |
| 6,408,387 B1 | 6/2002 | Wells | |
| 6,581,159 B1 | 6/2003 | Nevis et al. | |
| 6,792,556 B1 | 9/2004 | Dennis | |
| 6,886,102 B1 * | 4/2005 | Lyle ............................. | 726/23 |
| 6,886,111 B1 * | 4/2005 | Tran ............................. | 714/38 |
| 2003/0037244 A1 | 2/2003 | Goodman et al. | |
| 2003/0097558 A1 | 5/2003 | England et al. | |
| 2003/0097581 A1 | 5/2003 | Zimmer | |
| 2003/0174703 A1 * | 9/2003 | Relan .......................... | 370/392 |
| 2003/0188179 A1 | 10/2003 | Challener et al. | |
| 2004/0039924 A1 | 2/2004 | Baldwin et al. | |
| 2004/0111633 A1 | 6/2004 | Chang | |

(Continued)

FOREIGN PATENT DOCUMENTS

EP    1387522    2/2004

(Continued)

OTHER PUBLICATIONS

Int'l Application No. PCT/US2005/008616 Int'l Search Report & Written Opinion dated Oct. 4, 2006.

(Continued)

Primary Examiner—Kambiz Zand
Assistant Examiner—Dant B Shaifer Harriman
(74) Attorney, Agent, or Firm—Blakely, Sokoloff, Taylor & Zafman LLP

(57) ABSTRACT

Hardware correlation of software performance statistics. Software may gather data relating to performance of a hardware resource. A hardware component of the system of the hardware resource may obtain data relating to the performance of the hardware resource from a hardware component and the gathered software data, and correlate the software and hardware data. A level of correlation may be determined, and remedial action may be taken based on the correlation of the software and hardware data.

16 Claims, 3 Drawing Sheets

U.S. PATENT DOCUMENTS

| | | |
|---|---|---|
| 2005/0216577 A1 | 9/2005 | Durham |
| 2005/0278499 A1 | 12/2005 | Durham |
| 2005/0289311 A1 | 12/2005 | Durham |
| 2006/0095551 A1 | 5/2006 | Leung |
| 2006/0098646 A1 | 5/2006 | Sahita |

FOREIGN PATENT DOCUMENTS

| | | |
|---|---|---|
| WO | WO-WO0113198 | 2/2001 |

OTHER PUBLICATIONS

Twycross et al., "Implementing and Testing a Virus Throttle", Trusted Systems Laboratory, HP Laboratories Bristol, UK, HPL-2003-103; Proceedings of the 12th USENIX Security Symposium, Aug. 4-8, 2003, Washington DC, USA, (May 21, 2003), 11 pages.

Williamson, "Design, Implementation and Test of an Email Virus Throttle", Information Infrastructure Laboratory, HP Laboratories Bristol, HPL-2003-118, (Jun. 30, 2003), 10 pages.

Williamson, "Throttling Viruses: Restricting Propagation to Defeat Malicious Mobile Code", Information Infrastructure Laboratory, HP Laboratories Bristol, UK, Copyright Hewlett-Packard Co. 2002; HPL-2002-172, (Jun. 17, 2002), 7 pages.

Williamson, "Throttling Viruses: Restricting Propagation to Defeat Malicious Mobile Code", Information Infrastucture Laboratory, HP Laboratories Bristol, UK,; ACSAC Conference Dec. 2002 Las Vegas, NV, USA HPL-2002-172(R. 1), (Dec. 10, 2002), 9 pages.

Williamson et al., "Virus Throttling", Research Feature 1: Virus Bulletin, Virus Bulletin Ltd., The Pentagon, Abingdon, Oxfordshire, OX14 3YP, England,, (Mar. 2003), p. 8-11; 4 pages.

Williamson et al., "Virus Throttling for Instant Messaging", Digital Media Systems Laboratory, HP Laboratories Bristol, HPL-2004-81; Virus Bulletin Conference, Sep. 2004, Chicago, IL, USA, (May 5, 2004), 10 pages.

International Application No. PCT/US2005/008975 International Search Report & Written Opinion dated Jul. 7, 2005, Whole Document.

International Application No. PCT/US2005/008975 International Preliminary Report on Patentability (IPRP Ch. 1) dated Oct. 5, 2006, Whole Document.

U.S. Appl. No. 10/809,315, filed Mar. 24, 2004 (inventor David M. Durham); Final Office Action dated Dec. 21, 2007; Whole Document.

U.S. Appl. No. 10/809,315, filed Mar. 24, 2004 (inventor David M. Durham); Office Action dated Jul. 13, 2007; Whole Document.

U.S. Appl. No. 10/809,315, filed Mar. 24, 2004 (inventor David M. Durham); Office Action dated Jul. 2, 2008; Whole Document.

U.S. Appl. No. 10/809,316 Office Action mailed Apr. 22, 2008, 16 pgs., Whole Document.

Baugher, et al., "*MSEC Group Key Management Architecture*", <draft-ietf-msec-gkmarch-o6.txt> IETF Standard-Working-Draft, Internet Engineering Task Force, IETF, CH, vol. msec, No. 6, Sep. 8, 2006 pp. 1-35, XP015002805.

\* cited by examiner

PLATFORM-BASED IDENTIFICATION OF HOST SOFTWARE CIRCUMVENTION

FIELD

Embodiments of the invention relate to system security, and specifically hardware correlation of software security observations.

BACKGROUND

Host software, including security software, residing on a machine is often used to control, monitor, and/or manage a hardware resource. However, software is traditionally easily circumvented and/or compromised through corruption or attack. For example, software firewalls in network environments are subject to threat from malware, denial of service attacks, hacking, and even a user disrupting the function of the software (e.g., turning it off, changing settings). Attacks and/or malware may circumvent the software, for example a software firewall, and thus operate undetected by the software. The software may keep statistics/data relating to the performance of the hardware, but the statistics may be only as accurate as the software is immune from compromise, which, as stated above, is traditionally fairly easy.

BRIEF DESCRIPTION OF THE DRAWINGS

The detailed description below includes various illustrations in figures and accompanying drawings by way of example, and not by way of limitation. These figures may be briefly described as follows.

DETAILED DESCRIPTION

Various references herein to an "embodiment" are to be understood as describing a particular feature, structure, or characteristic included in at least one embodiment of the invention. Thus, the appearance of phrases such as "in one embodiment," or "in alternate an embodiment" may describe various embodiments of the invention, and may not necessarily all refer to the same embodiment.

Figure 1:
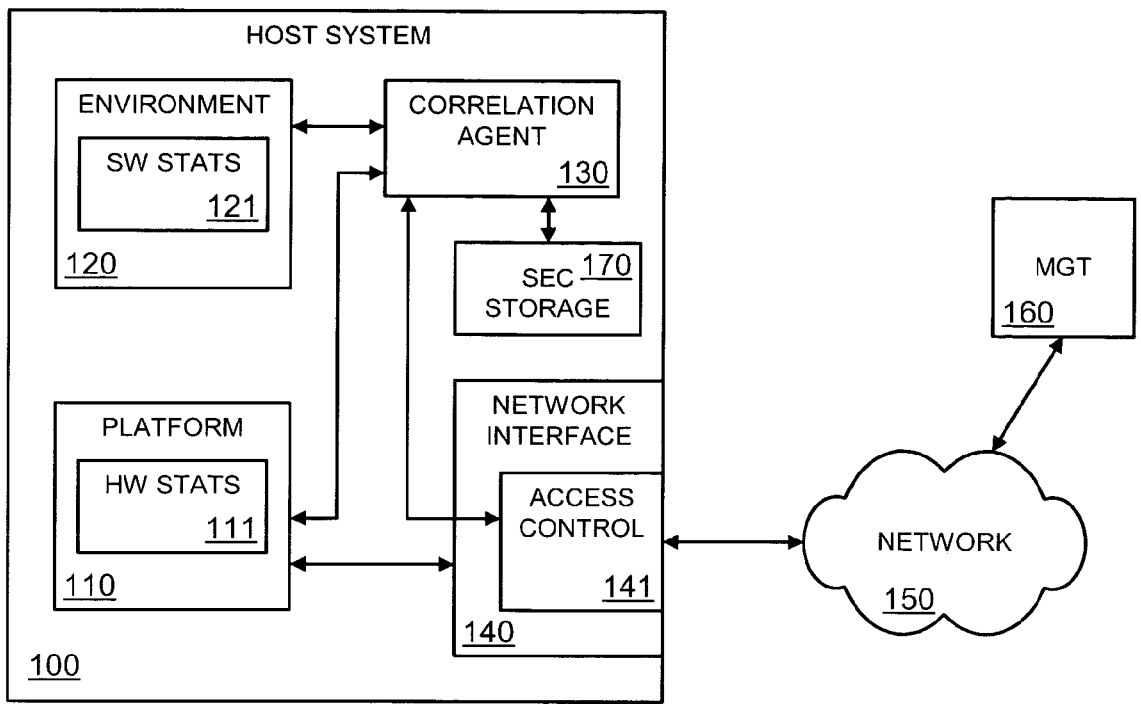
FIG. 1 is an embodiment of a block diagram of a system with a statistics correlation agent.

FIG. 1 is an embodiment of a block diagram of a system with a statistics correlation agent. Host system 100 represents a variety of electronic systems or devices. For example, host system 100 may include a personal computer (desktop, laptop, palmtop), a server, a handheld computing device, personal digital assistant (PDA), wireless computing device, cellular phone, game console, set-top box, etc. Host system 100 includes platform 110, which represents one or more hardware components for supporting host system 100. Platform 110 may include, among other components, a processor, a chipset, an interconnect bus, a memory and/or graphics controller, an interface controller, etc. In one embodiment platform 110 includes network interface 140.

Platform 110 may include hardware statistics (HW stats) 111. In one embodiment hardware statistics 111 represents one or more data elements related to, or indicating a state of a hardware component, performance, an operation log of a hardware component, etc. In one embodiment hardware statistics 111 may be information regarding a hardware component for which software is simultaneously, or in parallel, or in addition, is also collecting information. For example, hardware statistics 111 may represent traffic flow information relating to traffic packets/octets passing through network interface 140. Traffic may be considered to pass through a component if it is forwarded, operated on, manipulated, accessed, and/or other action is directed to the traffic by the component. In this sense, traffic may pass through either a hardware component (e.g., a network interface) or software component (e.g., a host driver in the data path). If there are multiple network interfaces on host system 100, hardware statistics 111 may represent an aggregation of statistics for each interface.

Hardware statistics 111 may alternatively, or additionally, refer to a function of platform 110 to obtain/gather and/or manage statistics. Hardware statistics 111 may be implemented in an intelligent I/O controller hub, a chipset, a local area network (LAN) on motherboard (LOM), an add-in network controller, etc. Gathering statistics may include running counters of traffic packets and/or octets. In one embodiment gathering statistics includes providing cryptographically secure statistics that allow validation of the contents of the packet, for example, to prevent an attacker from "stealing" actual data packets and injecting malicious packets into the path of the network traffic. Injecting malicious code into the path of the network traffic may be done by attack code for example, implemented as an intermediate driver conforming to the NDIS (Network Driver Interface Specification), or a variant, on Windows®.

Network interface 140 may provide access for host system 100 to network 150. Network interface 140 may include a network interface card or circuit, a network interface controller, a network interface driver, and/or a combination of these. A network interface card or circuit may be on-board or a separate component, and may be wired or wireless. In one embodiment network interface 140 collects statistics relating to traffic between host system 100 and network 150. These may be indicated to platform 110 or a component of platform 110. In one embodiment correlation agent 130 is a component of platform 110.

Environment 120 may represent a software environment, or a computing environment of host system 100. Environment 120 may include an operating system (OS), an application/program, etc. In one embodiment environment 120 includes an agent/module/component that collects statistics. Software statistics (SW stats) 121 represents data/information that may be gathered as statistics. The may be an overlap in statistics of software statistics 121 and statistics of hardware statistics 111. The overlap may occur, for example, if a hardware component and a software component are monitoring information for the same resource (hardware) both related to host network traffic, etc.

In one embodiment statistics (software statistics 121 and/or hardware statistics 111) may be gathered and/or correlated with statistical sampling, which may reduce overhead in obtaining/maintaining/processing the statistics as compared to continuously gathering statistics and/or correlating all statistics gathered. For example, statistics could be gathered/correlated every n packets (where n is an integer), randomly or pseudo-randomly selected for gathering/correlation, or could be selected on based on a dynamic variable that results in having a different offset between samples.

In one embodiment host system 100 includes correlation agent 130, which may represent one or more components of hardware, firmware, software, and/or a combination. Correlation agent 130 may reside on hardware of platform 110. Correlation agent 130 correlates hardware statistics 111 collected by hardware on platform 110 with software statistics 121 collected by a component of environment 120. Correlation of the statistics by correlation agent 130 provides a mechanism to ensure the reliability of the software statistics, and detect if a breach of security software applications has occurred. Security software applications are traditionally easy to turn off by a use or circumvented by attack by other software components; however, the hardware statistics generally cannot be disabled without disabling the platform itself.

In one embodiment correlation agent 130 directly reads software statistics 121 from host memory. Correlation agent 130 may compare a statistics counter as well as validate that the packet data has not been tampered with before it is read by a security software application. Correlation agent 130 may include functionality to remedy a perceived vulnerability inferred from statistics mismatch or skew between hardware statistics 111 and software statistics 121. Remedial action may include triggering an alert to an entity on host system 100 and/or network management (mgt) 160. Remedial action may also, or alternatively, include notifying access control 141, which may provide the ability to disable network access in whole or in part. In one embodiment, access control 141 includes "network circuit breaker" functionality to disable a port and/or interface to prevent all access out a network resource.

If host system 100 includes multiple network interfaces, correlation agent 130 may correlate an aggregate of hardware statistics 111 from each of the interfaces with corresponding software statistics 121.

In one embodiment host system 100 includes secure (sec) storage 170 to provide a secure storage of information. For example, hardware statistics 111 may be stored in secure storage 170, which may reduce the risk of access and/or modification of the statistics by an unauthorized entity. This may reduce the chance malicious code could circumvent both software and hardware. In one embodiment secure storage 170 may be a trusted platform module (TPM). Secure storage 170 may be a combination of logic and memory that requires an attestation by an entity requesting access prior to allowing the access. In one embodiment secure storage 170 may be part of correlation agent 130. In one embodiment secure storage 170 may be part of platform 110. Secure storage 170 may have a dedicated or an OOB communication channel to correlation agent 130.

Figure 2:
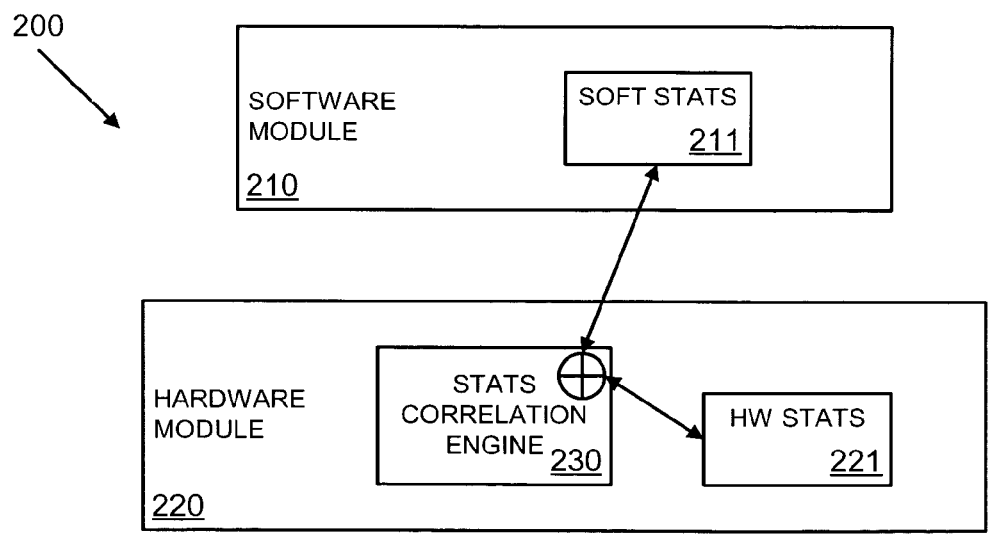
FIG. 2 is an embodiment of a block diagram of a statistics correlation engine to receive soft statistics and hardware statistics.

FIG. 2 is an embodiment of a block diagram of a statistics correlation engine to receive soft statistics and hardware statistics. System 200 may be and/or include a device/apparatus/machine having software and hardware components. In one embodiment software module 210 represents a software component running/operating on, or being executed on a computing environment, which may include an OS and/or one or more applications. In one embodiment software module 210 represents a subroutine, function, linked element, etc., of a software application on a computing environment. For example, software module 210 may be part of and/or associated with a software firewall, a user application, a hardware management application, or other application that may interface directly or indirectly with a hardware resource. Interfacing may include providing configurations/settings, causing to function, providing an interface to hardware drivers, etc. In one embodiment software module 210 represents a software agent that may observe a performance of the hardware resource. The software agent may be a software entity separate from an application interfacing with the hardware resource. Alternatively, the application interfacing the hardware resource may be considered a software agent with respect to observations recorded/statistics gathered.

Software module 210 may also interface with a hardware resource/component in collecting statistics of the component, represented as soft statistics 211. The information in soft statistics 211 may be dependent on the hardware component of interest to software module 210. Thus, soft statistics 211 may include information pertaining to incoming/outgoing network traffic, operability of the hardware, resources available (e.g., processing bandwidth, memory, etc.), etc.

Hardware module 220 may represent a circuit, subsystem, microprocessor, logic array, etc., that may reside on a platform of system 200. Hardware module 220 may include firmware to perform functions related to gathering and/or managing statistics of a hardware resource and/or observing/recording a performance/state of the hardware resource. Hardware statistics 221 may represent statistics gathered/collected, and may be dependent on the component of interest. In one embodiment hardware statistics 221 includes information gathered by software module 210 in soft statistics 211. Statistics may be gathered by software module 210 and hardware module 220 independently of each other. Both modules may interface with a hardware component and obtain statistics. Thus, the gathered information of soft statistics 211 and hardware statistics 221 may have the same areas/types/fields of information, but may be obtained through different mechanisms. In one embodiment, soft statistics 211 are gathered based on data received at software module from other software and/or hardware components, and hardware statistics 221 are gathered based on observations of a communication line, a hardware register, etc.

Hardware module 220 may include statistics (stats) correlation engine 230, which may provide functions to correlate information gathered in soft statistics 211 and hardware statistics 221, and/or represent the functions themselves. Statistics correlation engine 230 may receive/read statistics gathered by software module 210, for example, by reading a memory location. The memory location may be written by software module 210 as part of normal operation for internal use, in response to a request from statistics correlation engine 230, as part of a standard operation (keeping a log), etc. Correlating the statistics may include determining if the information in soft statistics 211 matches the information in hardware statistics 221.

Being in software, soft statistics 211 may be more vulnerable to compromise than observations made at the hardware level. Thus, soft statistics 211 may have incorrect/incomplete data due to a compromise in the integrity of software module 210. Soft statistics 211 may have incorrect/incomplete data due to a circumvention of software module 210. Statistics correlation engine 230 may verify that software module 210 has not been circumvented and/or infer that integrity of software module 210 is compromised and software module 210 is not operating/performing as intended. Failure of the statistics to correlate may indicate a lack or loss of integrity in, or circumvention of software module 210 that may be addressed by appropriate remedial action.

Figure 3:
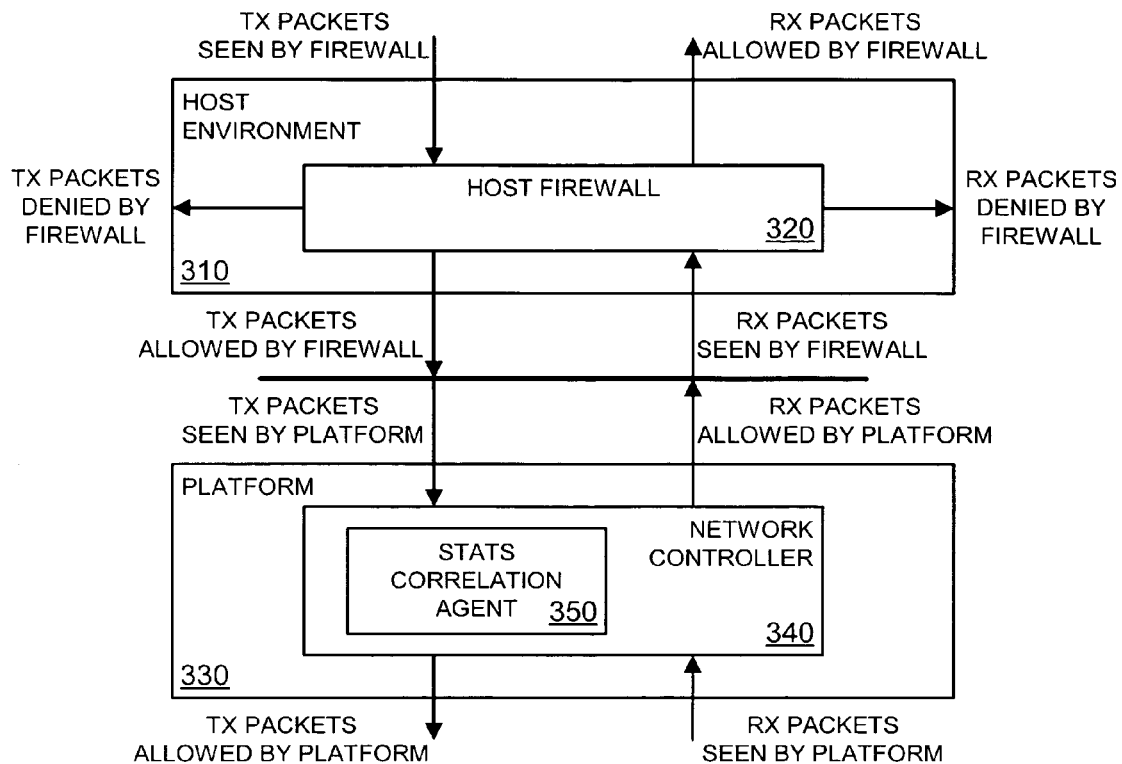
FIG. 3 is an embodiment of a block diagram of packet flow between a network controller and a firewall.

FIG. 3 is an embodiment of a block diagram of packet flow between a network controller and a firewall. Host environment 310 includes host firewall 320. Host environment 310 may include the computing environment of a networked device, system, machine, or apparatus. Host firewall 320 represents a security software application or module that operates on host environment 310. Host firewall 320 may monitor transmit/outgoing (Tx) and/or receive/incoming (Rx) traffic passing through host firewall 320. In one embodiment host firewall 320 includes a packet counter to determine a number of packets transmitted/received at host firewall 320. The number may be further broken down into specifics, for example, per port, per protocol, per connection, etc.

Transmit packets seen by host firewall 320 may come into host firewall 320, and some may be denied and others allowed. Transmit packets allowed and/or transmit packets denied may be monitored by host firewall 320, and stored as statistics. Receive packets may be subject to similar or the same monitoring, and receive packets seen by host firewall 320 may be stored, as well as receive packets allowed and receive packets denied by host firewall 320. Any or all of this information may be stored as soft/software statistics.

Platform 330 includes network controller 340, which may include hardware components for interfacing with an external system. Network controller 340 may monitor traffic passing through platform 330, and specifically network controller 340. Transmit packets allowed by host firewall 320 may be received at and seen by network controller 340. These transmit packets may be allowed by platform 330 through network controller 340. Similarly, a number of receive packets may be seen by platform 330, and allowed by platform 330 via network controller 340 and sent to host firewall 320.

Network controller 340 may collect statistics related to the packets. The statistics may be securely stored. In one embodiment hardware statistics are stored at a location in platform 330 inaccessible to host environment 310. Thus, an OS and/or an application of host environment 310 may be unable to access and/or modify the hardware statistics, meaning that even if host environment 310 is compromised by malware and/or attack, the hardware statistics gathered on platform 330 may be unaffected. Such a secure storage of the hardware statistics may provide a security verification mechanism in a system.

Statistics correlation agent 350 may reside on platform 330, for example, on network controller 340, and provide verification of the operation of host firewall 320 by correlating soft statistics gathered by host firewall 320 with hardware statistics gathered and potentially securely stored on platform 330. In one embodiment statistics correlation agent 350 gathers the hardware statistics. By correlating the soft statistics with the hardware statistics, statistics correlation agent 350 can ensure that every packet has been inspected by host firewall 320. For example, one or more of the following correlation tests may be performed by statistics correlation agent 350:

Soft Stats(hash of packet data)=Hardware Stats(hash of packet data)     (1)

Soft Stats(Total *Tx* packets−Total *Tx* packets denied) =Hardware Stats(Total *Tx* packets)     (2)

Soft Stats(*Tx* packets allowed)=Hardware Stats(Total *Tx* packets)     (3)

Soft Stats(*Rx* packets seen)=Hardware Stats(Total *Rx* packets)     (4)

These tests are to be understood as illustrative only, and not limiting. There may be more or fewer than these tests. Additionally, the tests may be different if a resource other than a network controller is the hardware resource being monitored by the hardware and software of a system.

In test (1), the hash value may be a pre-configured/defined value, and may be a cryptographic hash. Test (1) may represent a type of test that is based on accessing packet data and/or operation by statistics correlation agent 350 on one or more data packets. For example, in another example training/test packets may be inserted into the data that could be used to determine that a correct pattern is being followed. Tests (2), (3), and (4) may refer to observations only and may or may not include operation on traffic packets by statistics correlation agent 350.

One or more correlation tests may be performed. If one or more correlation tests fail (e.g., statistics do not match), platform 330 may infer that host firewall 320 has been compromised or circumvented by malicious code. Statistics correlation agent 350 may perform operations to provide corrective measures, for example, triggering a platform network traffic circuit breaker, which can disable one or more aspects of a network interface on the system. Additionally, a network administrator/manager may be informed of the breach.

Figure 4:
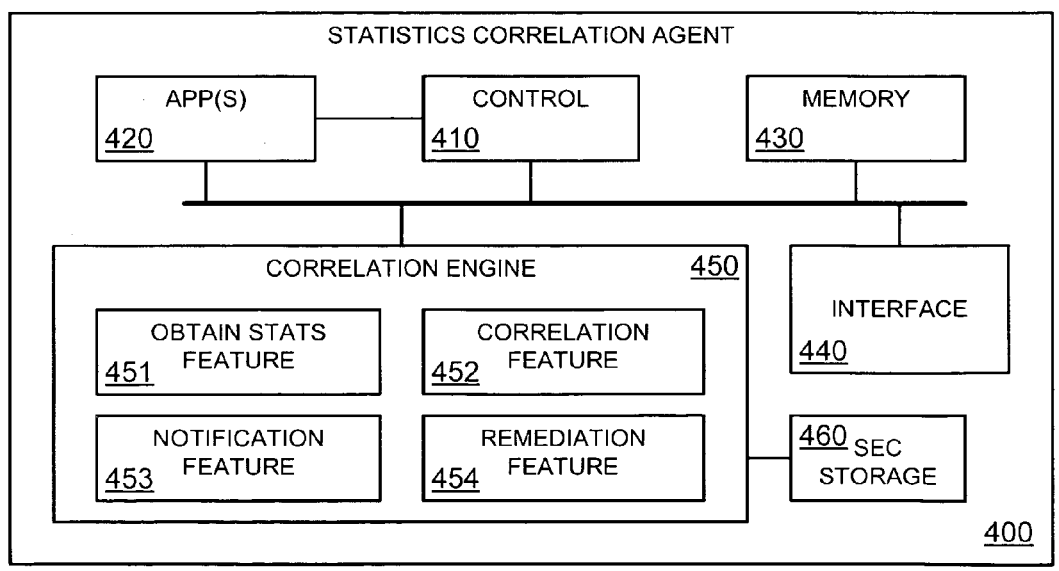
FIG. 4 is an embodiment of a block diagram of statistics correlation agent.

FIG. 4 is an embodiment of a block diagram of statistics correlation agent. Statistics correlation agent 400 represents a software module, a combination of logic, hardware, firmware and/or group/series/set of instructions for execution on a computation/logic device, a subsystem, or a virtual subsystem that is configured, enabled, or otherwise able to perform operations related to correlating hardware and software statistics in a machine. Control logic 410 directs the flow of operation of correlation agent 400. In one embodiment, control logic 410 may represent a series of software/firmware instructions to perform logic operations. In another embodiment, control logic 410 may be implemented by hardware control logic, or a combination of hardware-based control logic and software instructions. Hardware control logic may include discrete circuits, a processor, a microcontroller, a logic array, etc.

Interface 440 may provide a communication interface between correlation agent 400 and a software module/program/application, a computing platform, an external electronic system (not shown), and/or network. For example, correlation agent 400 may run on a computing platform on a computing system/device with interface 440 to provide a communication interface to resources on the computing system, for example, programs, software libraries, processors, etc.

Application(s) 420 represent one or more applications that may interact with correlation agent 400. In one embodiment application 420 may represent an application running on correlation agent 400. In another embodiment application 420 may represent one or more programs and/or other series of instruction sequences provided from outside correlation agent 400, for example, over interface 440 to be executed on control logic 410. In one embodiment correlation agent 400 may execute part of all of a user application or a system application. Application 420 may provide instructions to control logic 410 to cause or result in correlation agent 400 performing an operation.

Instructions and/or data may also be provided to control logic 410 by memory 430. For example, control logic 410 may access, or read a portion of memory 430 to obtain instructions to perform a series of operations and/or data for use with operations. Thus, control logic 410 can receive one or more instructions from internal application software running locally associated with correlation agent 400, such as application 420, from memory 430, and/or from an external application, storage medium, etc., through interface 450. Memory 430 may also store information for use by correlation agent 400 and/or represent a memory accessible to correlation agent 400. For example, memory 430 may be a storage structure having statistics to be correlated.

Correlation agent 400 includes correlation engine 450. Correlation engine 450 is shown with various features, which represent functions or features that correlation engine 450 may provide. Each function or feature may be provided through performing one or more operations. Correlation engine 450 may include one or more of: obtain statistics (stats) feature 451, correlation feature 452, notification feature 453, and remediation feature 454. In one embodiment one or more of these features may exist independently of and/or be external to correlation agent 400. Thus, correlation engine 450 may be more complex or less complex, containing some, all, or additional features to those represented in FIG. 4.

Obtain statistics feature 451 may provide functionality to obtain hardware and software statistics. Software statistics may be gathered/generated by a software entity, and stored in a memory location. Thus, obtain statistics feature 451 may include reading and/or accessing a memory location to read information stored therein. Hardware statistics may be kept by a hardware component, for example, a microprocessor executing firmware that may read and store data relating to a hardware resource. Hardware statistics may be stored in a secure location only available to properly authenticated entities.

In one embodiment correlation agent 400 includes secure (sec) storage 460 to provide a secure storage of information. Secure storage 460 may be included as part of correlation agent 400, but is not necessarily part of correlation agent 400. In one embodiment secure storage 460 resides outside hardware/firmware of correlation agent 400 as a component on a host system of which correlation agent 400 is part. Secure storage 460 may store hardware statistics, cryptographic information (hash values/algorithms), correlation results, and/or other information. In one embodiment secure storage 460 resides outside correlation agent 400 and has a dedicated link and/or a secure channel to correlation agent 400 with which information may be exchanged. In one embodiment secure storage 460 resides outside correlation agent 400 and is accessible only to properly authenticated entity, for example through attestation/exchange of secure information.

In one embodiment obtain statistics feature 451 may include functions to properly authenticate itself (statistics feature 451 or correlation engine 450) to secure storage 460 to obtain securely stored hardware statistics and/or other information. Obtain statistics feature 451 may in one embodiment gather the hardware statistics. Additionally, obtain statistics feature 451 in one embodiment includes the ability to communicate via an out-of-band (OOB) communication link. For example, a hardware component keeping statistics may have an OOB communication link to correlation agent 400. An OOB communication link may refer to a communication line/bus/link that is private and/or secure and not generally available in a system for communication.

Correlation feature 452 may provide functionality to cross-check or verify the software statistics against the hardware statistics. In one embodiment one or more correlation tests are performed on observations of the hardware and/or data relating to the hardware resource (for example, hashing particular data elements and comparing. Results of tests of correlation feature 452 may indicate detection of circumvention of a host firewall or other security application. In one embodiment correlation feature 452 may determine, based on one or more correlation tests, a level of circumvention, or a probability of circumvention (e.g., high risk, medium risk, low risk) given a particular pattern. Thus, rather than a binary response, correlation feature 452 may generate a degree or level of correlation between the hardware and software statistics. This gradation in correlation may provide correlation agent 400 to take one of multiple possible actions based on how good or bad correlation is. The correlation determination may indicate whether there is complete correlation, or whether the statistics match completely, between the hardware and software statistics.

Notification feature 453 may provide functionality to indicate a suspected security circumvention to an administrator and/or other remediation entity. Notification feature 453 may include communication over an OOB link to the administrator and/or remediation entity. Notification of a suspected security circumvention may be in addition to other action, such as remediation. In one embodiment notification feature 453 merely suggests a suspected breach, and an entity notified may make action in response to receiving the notification. In one embodiment notification feature 453 indicates a level of correlation.

Remediation feature 454 may provide functionality to take action in response to a notification of a level of correlation. For example, once the platform via statistics correlation agent 400 detects malicious activity, the platform can take corrective measures such as blocking network traffic to/from the system (network circuit breaker) and/or sending alerts to a remote administrator. Remediation feature 454 represents functions to provide such corrective measures. For example, all or some network traffic may be restricted/limited and/or stopped. This restriction may be directed to a specific connection.

The amount of restriction and/or the specific application of restriction may depend on a level of correlation found between the hardware and software statistics. For example, various levels of operation/function of the hardware may be possible, and each level may include various increasing restrictions on function. In one embodiment the level of operation is configurable, e.g., through providing settings/configuration data to the hardware component/resource. A level of correlation may be set to correspond with a level of operation. Thus, in response to a level of correlation determined for the resource, a corresponding level of functionality may be utilized for the resource.

In one embodiment correlation agent 400 is implemented with firmware, software, or a combination of firmware and software. Correlation agent 400 may be implemented in hardware and/or a combination of hardware and software and/or firmware. The software and/or firmware content may provide instructions to cause executing hardware to perform various operations, including some or all of the functions/features described above. Instructions that may cause/result in the performing of functions/operations described herein may be received via an article of manufacture by a machine/electronic device/hardware and performed by/on the machine. An article of manufacture may include a machine accessible/readable medium having content to provide the instructions. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include a computing system having code loaded on the computing system that the computing system may be able to execute when the computing system is in operation. Thus, delivering a computing system with such code may be understood as providing the article of manufacture with such content described above. Furthermore, storing code on a database or other memory location and offering the code for download over a communication medium via a propagated signal may be understood as providing the article of manufacture with such content described above. Thus, correlation agent 400 may represent a software module and/or a general computing element (e.g., a processor), a specific computing element (e.g., dedicated logic) executing software/firmware, and/or a signal embodying data to define/provide instructions to execute features of correlation agent 400.

Figure 5:
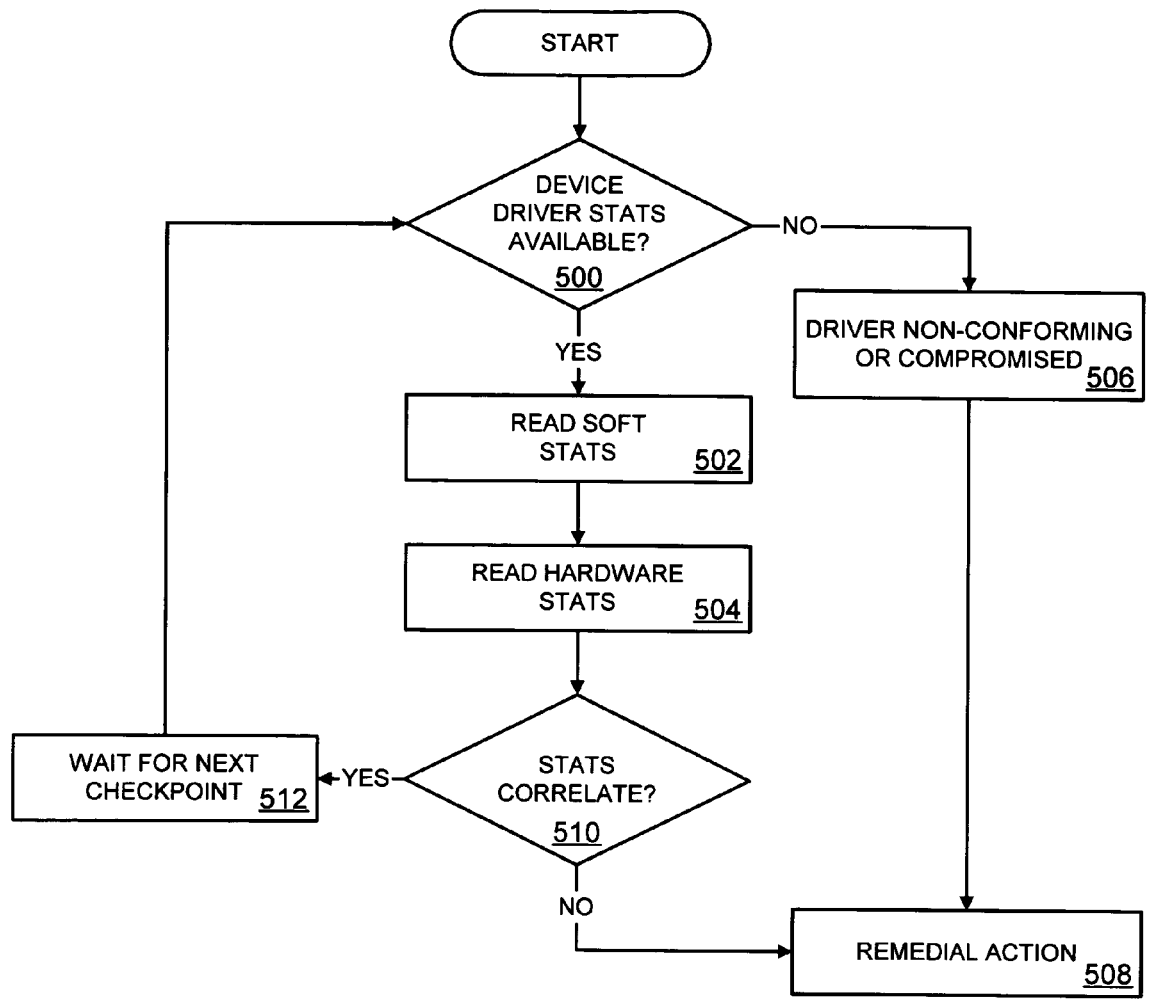
FIG. 5 is an embodiment of a flow diagram of statistics correlation.

FIG. 5 is an embodiment of a flow diagram of statistics correlation. A correlation agent determines if device driver or other software statistics are available, 500. In one embodiment the correlation agent or other platform component periodically polls a software module (e.g., a host software firewall) for statistics data. Alternatively, the correlation agent may periodically check a memory location where statistics are stored. In another embodiment the polling and/or checking may be randomly performed, for example, performed upon request by a security administrator, or a security software application.

If statistics are available, the agent may read the soft statistics, 502. The agent may also read hardware statistics, 504. FIG. 5 is not to be understood as suggesting a necessary order of events, and reading the soft or hardware statistics may be interchanged in order. Note that reading hardware statistics may also be performed prior to checking a software component to determine if statistics are available. Reading hardware statistics may include obtaining information from a hardware component on a system platform, of which the correlation agent may or may not be a part.

If device driver statistics are not available, 500, it may indicate that the driver is non-conforming or compromised, 506. A software module that fails to provide statistics may be inferred to be malfunctioning. A non-conforming driver may be a driver that fails to comply with a security policy for operation in a network. A non-conforming driver may be a driver that is outdated and fails to include a latest version of component management tools, e.g., statistics collecting. A compromised driver may be one that has been corrupted by attack traffic and/or other software. A driver may be compromised by intentional and/or inadvertent changing of software settings, deleting of required files, etc. If the driver is non-conforming or compromised, remedial action may be taken, 508, which is discussed in more detail below.

Collected software and hardware statistics may be correlated, 510. Having a software module pass collected statistics to an entity on the platform (i.e., the correlation agent) may provide a mechanism to improve security of a system. Where software alone may be easily compromised, correlation of software-collected data with secure platform-level gathered statistics may provide improved security capabilities. The soft and hardware statistics data may be validated using security functions such as authentication and encryption. If the data is valid, the next checkpoint may be awaited, 512, perhaps without taking any action. In one embodiment a "good" indicator may be generated, such as a heartbeat signal/data. A verification bit or series of bits may be generated to indicate a verified state of the system.

If the data is not valid, e.g., mismatch or skew in the correlation, 510, the platform (e.g., the correlation agent) may take remedial action, 514. Remedial action may include sending an alert to a security administrator (on- or off-system), disable the monitored hardware component/resource, or install and/or activate filters in the component and/or in a data path of the component, etc. Remedial action may also include increasing monitoring/security on functioning of the hardware component/resource, changing settings/configurations, snooping data traffic of the component, etc. The technique for collecting and correlating statistics may be optimized using appropriate packet sampling techniques.

Besides what is described herein, various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method exchanging data traffic between a security software module of a computing device and a hardware component on a hardware platform of the computing device, the security software module including an intrusion detection system, the hardware component including a network interface controller;

during the exchanging data traffic,
   maintaining a first running count of packets of data traffic observed by the hardware component, and
   maintaining a second running count of packets of data traffic observed by the security software module;
   generating hardware statistics based on the first running count;
   generating software statistics based on the second running count;
   sending the hardware statistics and the software statistics to a correlation agent of the computing device;
   the correlation agent evaluating a correlation between the hardware statistics and the software statistics, the evaluating including testing an amount of data determined to have been observed by the security software module with an amount of data determined to have been observed by the network interface controller;
   determining that a security risk is indicated by a result of the evaluating; and
   in response to determining that the security risk is indicated, triggering a remedial procedure including at least one of sending an alert of the security risk and sending an instruction to change a security setting related to the hardware platform.

2. A method according to claim 1, wherein evaluating the correlation between the hardware statistics and the software statistics further comprises comparing cryptographic hashes of the software statistics and the hardware statistics.

3. A method according to claim 1, wherein the hardware statistics comprises one of a count of all data packets received at the hardware component and a count of all packets transmitted from the hardware component.

4. A method according to claim 1, wherein changing a security setting related to the hardware platform comprises controlling functionality of the hardware component.

5. A method according to claim 1, wherein evaluating the correlation between the hardware statistics and the software statistics further comprises determining one of a set of levels of correlation.

6. A method according to claim 5, wherein changing a security setting related to the system hardware platform includes configuring the hardware component to operate in one of multiple levels of restricted operation in response to determining the level of correlation, the level of restricted operation corresponding to the level of correlation.

7. An article of manufacture comprising a machine accessible storage medium having content to provide instructions to result in a machine performing operations including:
exchanging data traffic between a security software module of a computing device and a hardware component on a hardware platform of the computing device, the security software module including an intrusion detection system, the hardware component including a network interface controller,
- during the exchanging data traffic,
  - maintaining a first running count of packets of data traffic observed by the hardware component, and
  - maintaining a second running count of packets of data traffic observed by the security software module;
- generating hardware statistics based on the first running count;
- generating software statistics based on the second running count;
- sending the hardware statistics and the software statistics to a correlation agent of the computing device;
- the correlation agent evaluating a correlation between the hardware statistics and the software statistics, the evaluating including testing an amount of data determined to have been observed by the security software module with an amount of data determined to have been observed by the network interface controller;
- determining that a security risk is indicated by a result of the evaluating; and
- in response to determining that the security risk is indicated, triggering a remediation procedure including one of sending an alert of a security risk to the platform of the machine and sending an instruction to change a security setting related to the platform of the machine.

8. An article of manufacture according to claim 7, wherein the second set of statistics comprises a count of octets of data seen at the hardware component.

9. An article of manufacture according to claim 7, wherein sending the alert of the security risk comprises the notifying a security entity.

10. An article of manufacture according to claim 7, wherein sending the instruction to change the security setting comprises sending an instruction to restrict operation of the hardware component.

11. An article of manufacture according to claim 8, wherein restricting operation of the hardware component further comprises disabling the hardware component.

12. An apparatus comprising:
a hardware resource on a system platform, the hardware resource including a network interface controller, the hardware resource to exchange data traffic with a security software agent executed by the apparatus, the security software agent including an intrusion detection system; and
a correlation agent on the system platform to receive hardware statistics generated based on a first running count maintained during the exchange of the data traffic for packets of data traffic observed by the hardware resource, the correlation agent further to receive software statistics generated based on a second running count maintained during the exchange of the data traffic for packets of data traffic observed by the security software agent, the correlation agent further evaluate a correlation between the hardware statistics and the software statistics, the evaluating including testing an amount of data determined to have been observed by the security software agent with an amount of data determined to have been observed by the network interface controller, the correlation agent further to determine from a result of the evaluating that the security software agent has been circumvented, the correlation agent further to trigger a remedial procedure in response to determining that the security software agent has been circumvented, the remedial procedure including at least one of sending an alert of a security risk and sending an instruction to change a security setting related to the system platform.

13. An apparatus according to claim 12, wherein the correlation agent to receive the hardware statistics comprises the correlation agent to monitor the hardware resource and gather the statistics relating to the performance of the hardware resource.

14. An apparatus according to claim 12, wherein the security software agent further comprises a software application to interface with the hardware resource.

15. An apparatus according to claim 12, wherein the correlation agent comprises a firmware component to be executed by a processor on the system platform.

16. An apparatus according to claim 12, wherein changing the security setting related to the system platform includes disabling the hardware resource.

* * * * *